United States Patent [19]

Alesi et al.

[11] Patent Number: 5,895,025
[45] Date of Patent: Apr. 20, 1999

[54] EQUIPMENT SUPPORTS

[75] Inventors: John Alesi, Dunwoody; Robert L. Browning, Atlanta, both of Ga.

[73] Assignee: Formex Manufacturing, Inc., Lawrenceville, Ga.

[21] Appl. No.: 08/668,212

[22] Filed: Jun. 21, 1996

[51] Int. Cl.$^6$ ....................... F16M 1/00
[52] U.S. Cl. ............ 248/678; 248/679; 108/51.11; 108/53.11
[58] Field of Search .................. 248/678, 679, 248/346.01; 108/53.1, 51.11

[56] References Cited

U.S. PATENT DOCUMENTS

| | | | |
|---|---|---|---|
| 3,342,447 | 9/1967 | Marsh | 248/638 |
| 3,962,660 | 6/1976 | Duckett | 248/678 X |
| 4,023,755 | 5/1977 | Alesi, Jr. | 248/678 |
| 4,050,659 | 9/1977 | McCannon et al. | 248/678 X |
| 4,191,522 | 3/1980 | Turner . | |
| 4,399,975 | 8/1983 | Trimarco | 248/678 |
| 4,505,449 | 3/1985 | Turner et al. | 248/678 X |
| 4,869,456 | 9/1989 | Jacobs | 248/678 |
| 4,970,043 | 11/1990 | Doan et al. . | |
| 5,076,534 | 12/1991 | Adam | 248/678 |
| 5,209,968 | 5/1993 | Sweeney | 248/679 X |
| 5,268,226 | 12/1993 | Sweeney . | |
| 5,333,830 | 8/1994 | Millen | 248/679 |
| 5,401,456 | 3/1995 | Alesi et al. . | |
| 5,453,236 | 9/1995 | Daly . | |

OTHER PUBLICATIONS

Excerpt from the Bramec 1996 Master Catalog (two pages).
Brochure of Carson–Brooks Plastics, Inc. entitled "Dura-Grid Condenser Pads" (four pages; undated).
Brochure of Carson–Brooks Plastics, Inc. entitled "Durability in Structural Foam Products" (one page; undated).
Five photographs of a DuraGrid product of Carson–Brooks Plastics, Inc.
Brochure of Hefco Plastics, Inc. entitled "Come Over to Our Pad Hef–T–Pad" (two pages; undated).
Brochure of Hefco Plastics, Inc. entitled "Hef–T–Pad" (four pages; undated).
Six photographs of a Hef–T–Pad product of Hefco Plastics, Inc.
Promotional Literature of Gaia Technologies, Inc. entitled "The Black Pad" (three pages; mentions printing date of Oct. 23, 1995).
Excerpt from the Diversitech 1995 List Price Catalog (five pages).
Brochure of Diversitech entitled "Only concrete looks like concrete" (two pages; undated).
Brochure of Diversitech entitled "Diversitech's A/C Condensate Drain Pans" (two pages; undated).

*Primary Examiner*—Peter M. Cuomo
*Assistant Examiner*—Rodney B. White
*Attorney, Agent, or Firm*—Dean W. Russell; Kilpatrick Stockton LLP

[57] ABSTRACT

Equipment supports having irregular lower surface disclosed. Ridges protruding from the lower surface of support (if present) displace soil in use, while recesses in the surface (if present) tend to collect or accumulate the soil. The surface features effectively lock the support in position relative to the ground, inhibiting lateral and rotational movement of the base after the equipment is mounted. In some embodiments, ridges of one pad fit within recesses of another when the pair is stacked with their bottom surfaces in contact, thereby reducing the volume needed to transport the pads between locations.

6 Claims, 3 Drawing Sheets

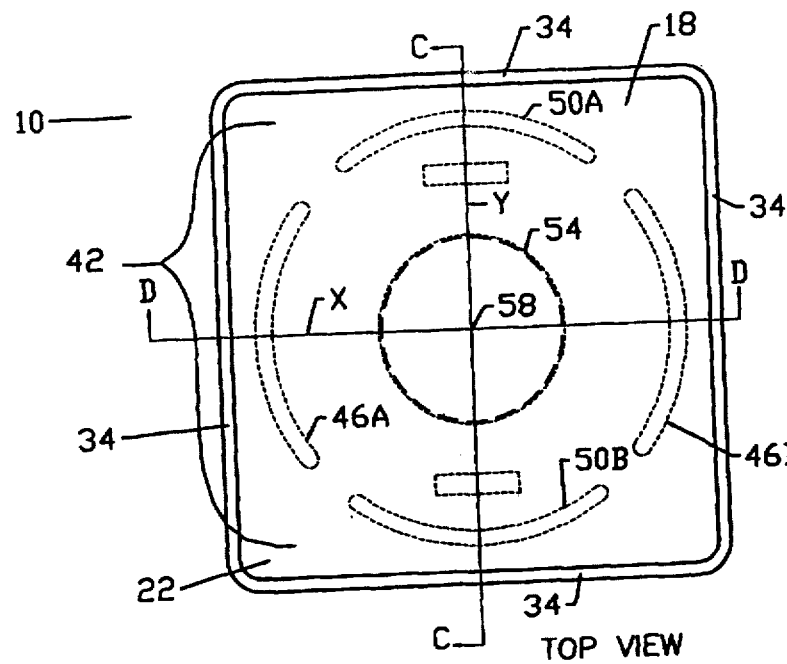
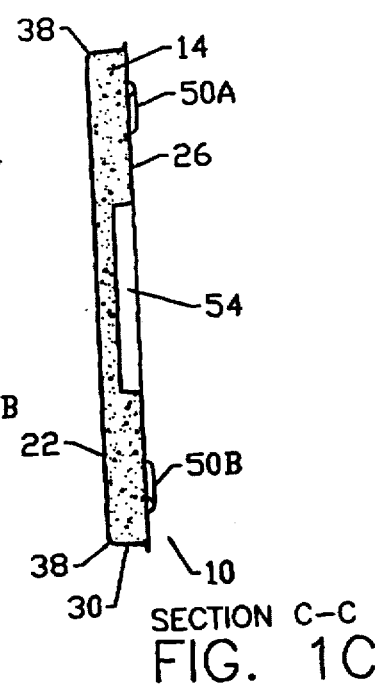
FIG. 1A  TOP VIEW
FIG. 1C  SECTION C-C
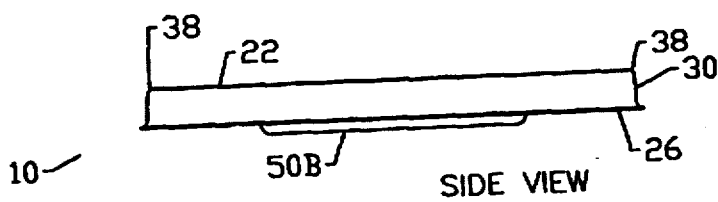
FIG. 1B  SIDE VIEW
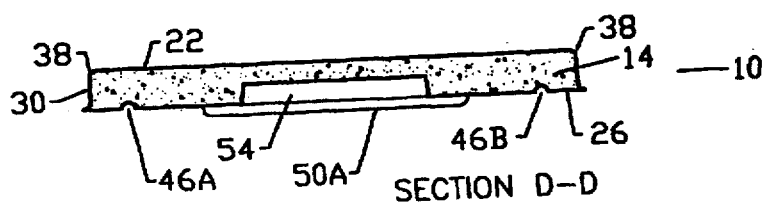
FIG. 1D  SECTION D-D

EQUIPMENT SUPPORTS

FIELD OF THE INVENTION

The present invention relates to equipment supports or platforms and in particular to pre-formed pads or similar structures on which industrial equipment including (but not limited to) air conditioner condensers can be mounted.

BACKGROUND OF THE INVENTION

Historically, external heating, ventilation, and air conditioning ("HVAC") and analogous equipment have been mounted on concrete blocks or pads. These pads isolate the equipment from contaminants such as dirt, debris, and moisture typically present on the adjacent ground, thereby reducing the detrimental effects of such contaminants on the operation of the equipment. The pads additionally may dampen at least some ground- or equipment-based vibrations, diminishing the likelihood of damage caused by the vibrations to the mounted equipment, and decrease or prevent settling of the equipment into the soil itself.

Although useful for these purposes, concrete pads are both expensive to create (if formed on-site) and difficult to transport (if pre-cast). Pouring concrete is, of course, labor intensive, requiring substantial human effort to form a suitable pad. While pre-cast concrete bases may be less expensive to construct, their weight and brittleness likely increase transportation-related difficulties and cost.

To avoid these problems associated with conventional concrete pads, U.S. Pat. No. 4,505,449 to Turner, et al. ("the Turner patent") describes a composite equipment base having a core of expanded polystyrene ("EPS"). According to the Turner patent, use of EPS decreases the weight of the base by as much as seven-eighths of the weight of a (solid) concrete base of equivalent size. Applied to the sides and top of the EPS core is a "concrete coating" of "a fiberglass/cement composition using alkali resistant fiberglass strands." See col. 2, lines 32–34. Although denominated a "low density" composite material, the resulting structure nonetheless "appears to be an ordinary solid concrete slab" when viewed in use. See col. 1, lines 43–44.

The Turner patent additionally mentions possibly applying "a thin coating of cementitious material . . . to the core bottom." See col. 2, lines 50–52. The existence of such coating appears not to be preferable, however, as it counteracts advantageous characteristics of the base described in the Turner patent. For example, exposing the bottom of the EPS core purportedly permits it to act "as a cushion preventing damage to the top surface of the base stacked beneath the exposed bottom" during shipping. See id., lines 61–63. The exposed core also allows for easier installation of the base since the polystyrene will conform to a ground configuration thus requiring less smoothing than that necessary for the installation of ordinary concrete bases.

See id., lines 64–68.

U.S. Pat. No. 5,333,830 to Millen ("the Millen patent") discloses another faux-concrete composite pad. As described in the Millen patent, the pad includes a cellular core embedded in a cementitious shell. A "bottom facing sheet" of undisclosed composition seals the core within the shell, its presence being masked by additional shell material so that, "from all outward appearances," the pad is "a solid block" of the cementitious material. See col. 4, lines 53–54. Discussed solely in the Abstract of the Millen patent is a feature of the cellular core, which purportedly "enables the pad to conform to a degree to surfaces on which the pad is placed." See Abstract, lines 13–14. The Millen patent fails to describe how such conformation can occur, however, particularly when both the facing sheet and rigid cementitious shell material encapsulate the core bottom.

Because directed to faux-concrete bases of decreased weight, the Turner and Millen patents otherwise disclose generally conventional equipment pad structures. FIGS. 1–3 of the Turner patent, for example, illustrate smooth-bottomed pads regardless of whether the EPS is exposed or, alternatively, coated with cementitious material. FIGS. 1–2 of the Millen patent likewise illustrate predominantly flat-bottomed structures with essentially no surface irregularities. The pads of these patents thus apparently rely solely on the weight of the mounted equipment (and possible compression of any exposed core) to seat them on the ground.

SUMMARY OF THE INVENTION

The present invention, by contrast, comprises an equipment support having an irregular lower surface. Unlike those of the Turner and Millen patents (and many other existing pads), the inventive pad utilizes an irregular bottom to facilitate its seating on the ground. Ridges protruding from the (otherwise generally flat) lower surface of the base, for example, displace soil in use, while recesses in the surface tend to collect or accumulate the soil. When used cooperatively, therefore, the ridges and recesses effectively lock the support in position relative to the ground, inhibiting lateral and rotational movement of the base after the equipment is mounted. Alternative embodiments of the invention may omit any or all of either the ridges or the recesses, however, as in some cases either type of surface irregularity may be adequate to inhibit such movement.

Consistent with the base disclosed in the Turner patent, conventional pads contain flat top and bottom surfaces for ease of transport. These regular surfaces permit pads to be stacked one upon another, minimizing the volume needed for shipping each. To the extent supports of the present invention include generally flat upper surfaces and protrusions in their lower surfaces, however, they obviously will not utilize minimum shipping volume if stacked top to bottom. Thus, embodiments of the present invention also contemplate nesting of ridges and recesses in an associated pairs of pads. In other words, if two pads of these embodiments are stacked with their bottom surfaces in contact, the ridges of one will fit within the recesses of the other.

Structurally, an equipment support of the present invention may comprise an EPS core encapsulated within a polyethylene shell. Using polyethylene provides a shell that resists ultraviolet (UV) radiation, moisture, organisms, impacts, and many common chemicals, enhancing the durability of the pad over other commercially-available plastics. When encapsulated, at least portions of the solid EPS foam block typically conform and thermally fuse to the polyethylene shell, minimizing voids or gaps within the shell. A suitable encapsulation method is disclosed in commonly-owned U.S. Pat. No. 5,401,456 to Alesi, Jr., et al. ("the Alesi patent"), which patent is incorporated herein in its entirety by this reference, although other foams, polymers, and encapsulation methods may be used instead if consistent with the inventive concepts disclosed herein.

Supports of the present invention additionally may include either or both of textured upper surfaces and flanged lower surfaces. Texturing the upper surface of the pad increases the coefficient of friction between it and the mounted equipment, reducing the possibility of relative movement between them. It also facilitates drainage in certain instances, channeling fluid to the sides of the pad rather than causing puddling. The flanged lower surface increases the strength of the pad, providing additional surface area contacting the ground over which the weight of the mounted equipment is distributed.

It is thus an object of the present invention to provide an equipment support having an irregular lower surface.

It is an additional object of the present invention to provide an equipment support in which the lower surface is substantially flat but includes either (1) one or more protrusions, (2) one or more recesses, or (3) both (1) and (2).

It is another object of the present invention to provide a pair of equipment supports, each of whose lower surface has at least one ridge and at least one recess, the ridge of one equipment support being received by the recess of a corresponding support and the recess of the one receiving the ridge of the corresponding support when the lower surfaces of the supports are brought together for transport.

It is yet an additional object of the present invention to provide an equipment support comprising an EPS foam core encapsulated within a polyethylene shell.

It is a further object of the present invention to provide an equipment support having either or both of a textured upper surface and a flanged lower surface.

Other objects, features, and advantages of the present invention will become apparent with reference to the remainder of the text and the drawings of this application.

BRIEF DESCRIPTION OF THE DRAWINGS

FIG. 1A is a top plan view of an equipment support of the present invention with features of its lower surface shown in phantom lines.

FIG. 1B is a side view of the equipment support of FIG. 1A.

FIG. 1C is a cross-sectional view of the equipment support of FIG. 1A taken along line C—C of that figure.

FIG. 1D is a cross-sectional view of the equipment support of FIG. 1A taken along line D—D of that figure.

DETAILED DESCRIPTION

Figure 1E:
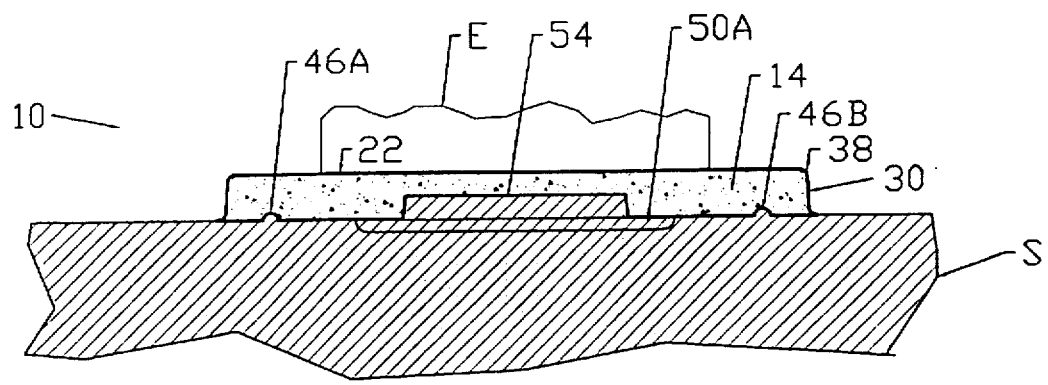
FIG. 1E is a view similar to FIG. 1D of the equipment support positioned on the ground.

FIGS. 1A–D illustrate an equipment support or pad 10 of the present invention. Pad 10 contains core 14 surrounded by shell 18. As shown in FIGS. 1A–D, shell 18 includes upper surface 22, lower surface 26, and side walls 30, which together completely encapsulate core 14. By choosing an appropriate polymer (e.g. high density, high molecular weight polyethylene) or other material for shell 18, core 14 can effectively be isolated from the deleterious effects of UV radiation, moisture, organisms, impacts, and many common chemicals, for example. Mounting a condenser or other equipment on upper surface 22 similarly places the entirety of shell 18 between the equipment and the adjacent ground, helping to insulate the equipment from contaminants such as dirt, debris, and moisture contained therein or thereon.

Shell 18 may be thermoformed about core 14, if desired, using twin-sheet forming methods described in the Alesi patent. The resulting pad 10 may thus contain flange 34 at the periphery of lower surface 26 of shell 18, increasing the strength of pad 10 by providing additional surface area over which the weight of the mounted equipment can be distributed. In such cases side walls 30 will typically not be normal to upper surface 22, but rather will differ from 90° by the draft angles present in the utilized molds. Side walls 30 additionally may be bevelled at their intersections 38 with upper surface 22. Those skilled in the art will, of course, recognize that other forming methods may be employed consistent with the present invention, so that pad 10 need not be designed as described above. The thermoforming processes of the Alesi patent nonetheless are especially useful in creating pad 10, fusing the solid EPS block (or other material) of core 14 to shell 18 to minimize voids or gaps within it.

Unlike many existing equipment bases, the lower surface 26 of pad 10 is irregular. FIGS. 1A details an exemplary arrangement of features 42 forming such irregularities, designed principally to inhibit lateral and rotational movement of pad 10 relative to the ground. In the embodiment of pad 10 shown in FIGS. 1A–D, features 42 include recesses 46A–B and protrusions or ridges 50A–B, together with central recess 54. In use, recesses 46A–B and central recess 54 tend to collect soil S (see FIG. 1E), while ridges 50A–B tend to displace it. Doing so effectively locks pad 10 in position relative to the ground, inhibiting its lateral and rotational movement after equipment E is mounted. Because the remainder of lower surface 26 is flat (or at least substantially so), it tends to distribute the weight of the equipment E over a sufficient area to prevent pad 10 from settling (sinking) into the soil.

Embodiments of pad 10 consistent with FIGS. 1A–D have recesses 46A–B and ridges 50A–B that are generally arcuate in shape. Although such shape is particularly useful in maintaining pad 10 in position when in use, recesses 46A–D and ridges 50A–B need not be arcuate, but rather may assume any shape adequate to achieve the desired results. Similarly, although central recess 54 is shown as being generally circular, it need not be so shaped.

Recesses 46A–B, ridges 50A–B, and central recess 54 likewise need not be positioned as shown in FIG. 1A. So configuring features 42 may be useful, however, in maintaining pad 10 in place when in use. For example, whereas central recess 54 likely assists in reducing lateral movement of pad 10 by collecting soil S, it perhaps less inhibits rotational motion of pad 10 than do recesses 46A–B and ridges 50A–B positioned closer to flange 34 at the periphery of lower surface 26. Alternating remaining features 42 about the circumference of central recess 54 (e.g. having recess 46A, ridge 50A, recess 46B, and ridge 50B when viewed counter-clockwise from lower surface 26) additionally produces a generally-serpentine surface of soil S about the circumference, enhancing the ability of soil S to assist in maintaining pad 10 in place.

Figure 3:
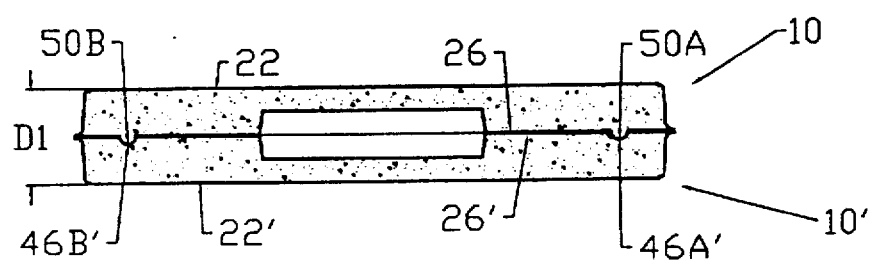
FIG. 3 is a cross-sectional view of a pair of equipment pads of FIGS. 1A–D with their lower surface features mated for transport.

As shown in FIG. 3, appropriately positioning features 42 may permit nesting of ridges 50A–B within recesses 46A–B.

FIG. 3 details identically-formed pads 10 and 10', whose respective lower surfaces 26 and 26' have been brought together (flush) for transport. Ridge 50A in such configuration is received by recess 46A', while ridge 50B is received by recess 46B'. Although not shown in FIG. 3, recesses 46A–B similarly receive corresponding ridges of pad 10'. Notwithstanding the existence of ridges 50A–B and corresponding ridges of pad 10', therefore, the distance D1 between upper surfaces 22 and 22' is no greater than if the lower surfaces 26 and 26' of respective pads 10 and 10' lacked any surface protrusions. The resulting volume required to ship pads 10 of the present invention is thus approximately equal to that required to transport existing pads having regular upper and lower surfaces.

In the specific embodiment of the invention shown in FIGS. 1A–D, lower surface 26 of pad 10 (including flange 34) measures 31.232"×31.232" and pad 10 itself is approximately 2.039" in height. Central recess 54, approximately nine inches in diameter and three-quarters of an inch deep, is concentric about the center 58 of lower surface 26. Recesses 46A–B have depth of approximately one-half inch, while ridges 50A–B protrude from lower surface 26 by about the same amount. To ensure complete nesting, however, ridges 50A–B may be designed to protrude from lower surface 26 by an amount slightly less than the depth of recesses 46A–B. For the same reason the arc (or other) length of ridges 50A–B likewise may be made slightly less than that of recesses 46A–B.

In FIGS. 1A–D, recesses 46A–B and ridges 50A–B are equidistant from center 58, and the axis X bisecting recesses 46A–B is normal (i.e. 90°) to the axis Y bisecting ridges 50A–B. Although not identified as such in FIG. 3, axes X and Y are aligned when pads 10 and 10' are configured as shown in that drawing. Numerous other sizes, shapes, and configurations of equipment supports may be made according to the present invention, however.

FIGS. 2A–D, for example, illustrate an alternative pad 60. Like pad 10, pad 60 includes core 64 and shell 68 having upper surface 72, lower surface 76, side walls 80, and flange 84. Pad 60 similarly contains features 92, which encompass recesses 96A–B, ridges 100A–B, and central recess 104. One or more supplemental recesses 106 additionally may (but need not) be included as parts of features 92, providing further volume for collection of soil S.

Figure 4:
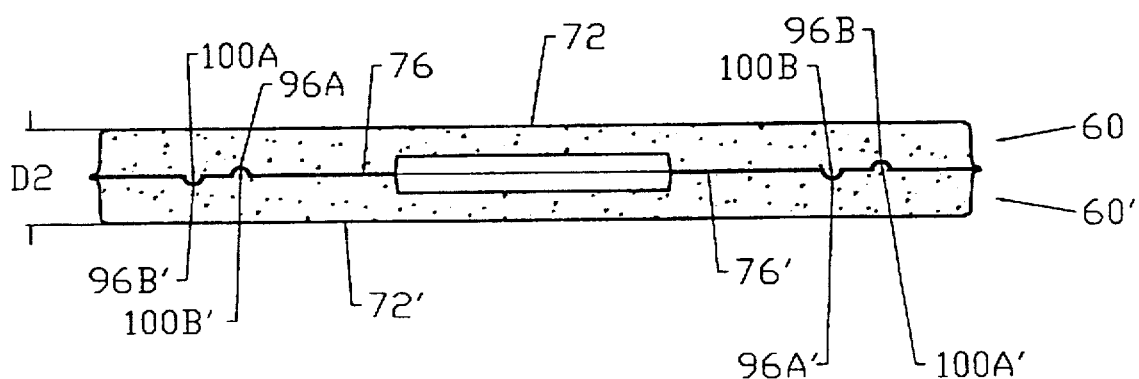
FIG. 4 is a cross-sectional view of a pair of equipment pads of FIGS. 2A–D with their lower surface features mated for transport.
Figure 2A:
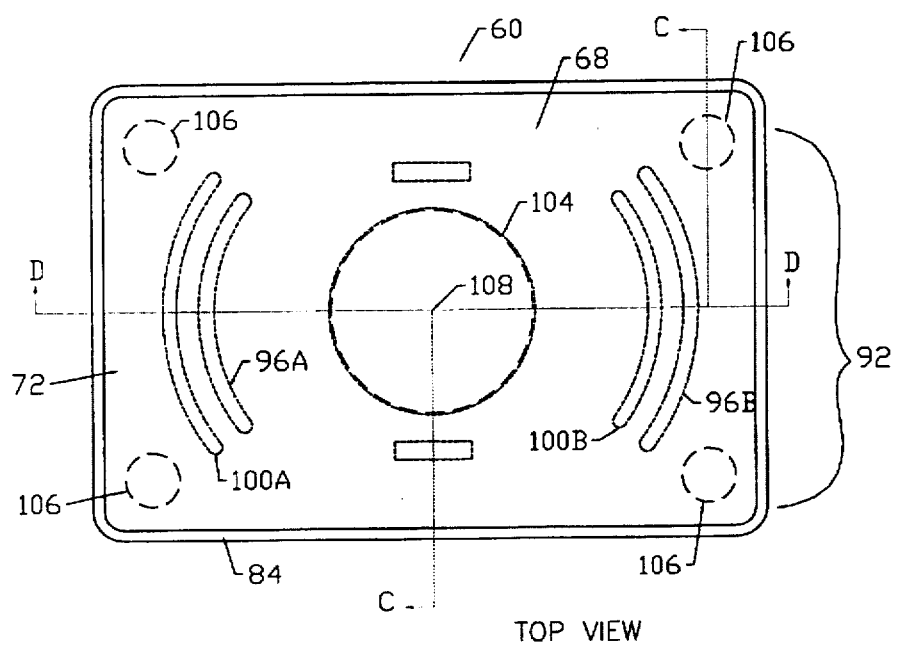
FIG. 2A is a top plan view of another embodiment of an equipment support of the present invention with features of its lower surface shown in phantom lines.
Figure 2C:
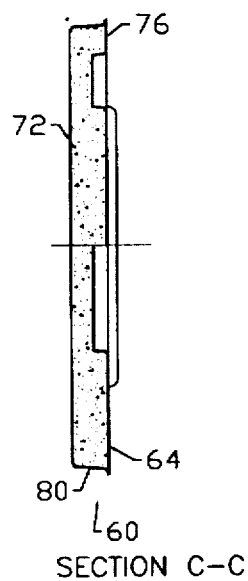
FIG. 2C is a cross-sectional view of the equipment support of FIG. 2A taken along line C—C of that figure.
Figure 2B:
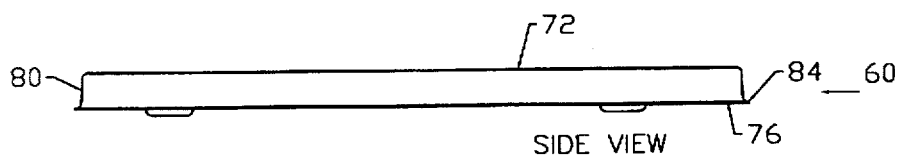
FIG. 2B is a side view of the equipment support of FIG. 2A.
Figure 2D:
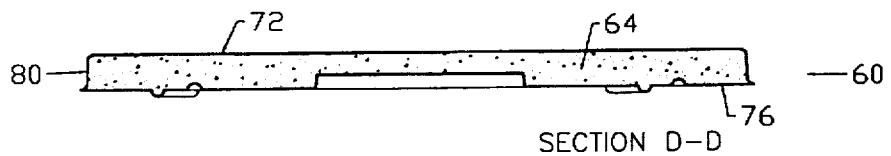
FIG. 2D is a cross-sectional view of the equipment support of FIG. 2A taken along line D—D of that figure.

Unlike those of pad 10, recesses 96A–B and ridges 100A–B are not located equidistant from center 108, however, nor are recesses 96A–B rotated ninety degrees from ridges 100A–B. Instead, recess 96A and ridge 100B are positioned equidistant from and on opposite sides of center 108, while recess 96B and ridge 100A are similarly placed. Thus, as shown in FIG. 4, lower surfaces 76 and 76' of identical pads 60 and 60' may be brought together for shipping with ridge 100A received by recess 96B', ridge 100B' received by recess 96A, ridge 100B received by recess 96A', and ridge 100A' received by recess 96B. Again, therefore, mating recesses 96A–B and ridges 100A–B reduces the distance D2 between upper surfaces 72 and 72' to approximately that of a pair of pads whose lower surfaces 76 and 76' lack protrusions.

One embodiment of pad 60 has dimensions 37.232"× 25.232"×2.039". Those skilled in the art will recognize that the dimensions of both pads 10 and 60 are not critical, however, and that equipment supports of other sizes, thicknesses, and shapes may be made pursuant to the present invention. Pads 10 and 60 need not always include both recesses and ridges, moreover, as any or all of either surface feature may be omitted when necessary or desired. Although generally flat, upper surfaces 22 and 72 further may be textured when appropriate to increase the coefficient of friction between such surfaces and the equipment mounted thereon. Texturing upper surfaces 22 and 72 also may facilitate drainage, channeling fluid to integrally-formed side walls 30 and 80, respectively for conveyance to the ground.

The foregoing is provided for purposes of illustrating, explaining, and describing embodiments of the present invention. Modifications and adaptations to these embodiments will be apparent to those of skill in the art and may be made without departing from the scope or spirit of the invention. For example, although solid foam blocks with regular lower surfaces may be used for cores 14 or 64, such lower surfaces alternatively may include features identical to those of lower surfaces 26 or 76 to decrease further the possibility of voids or gaps within shells 18 or 68.

What is claimed is:

1. A pad for supporting equipment above soil when in use, comprising:
   a. an upper surface adapted to receive the equipment when in use; and
   b. a lower surface having:
      i. a generally flat portion;
      ii. a recess for receiving the soil when in use; and
      iii. a protrusion for displacing the soil when in use; and
   in which the recess and protrusion are positioned so that, if the lower surface is brought flush with a lower surface of a similarly-formed second pad, the recess is adapted to receive a protrusion of the second pad and the protrusion is adapted to be received by a recess of the second pad.

2. A pad according to claim 1 in which the recess and protrusion are arcuate in shape.

3. A pad according to claim 2 further comprising a plurality of side walls connecting the upper and lower surfaces to form a shell.

4. A pad according to claim 3 in which the plurality of side walls are integrally formed with the upper surface, further comprising a foam core encapsulated by the shell.

5. A pad comprising:
   a. a foam core; and
   b. a shell thermoformed about and encapsulating the foam core, the shell comprising:
      i. an upper surface;
      ii. a lower surface having a center and comprising:
         A. a generally flat portion;
         B. first and second protrusions; and
         C. first and second recesses, the first recess located the same distance from the center as at least one of (i) the second recess, (ii) the first protrusion, and (iii) the second protrusion and (2) of shape complementing at least one of the first and second protrusions; and
      iii. a plurality of side walls connecting the upper and lower surfaces.

6. A pad according to claim 5 in which the foam core is made of expanded polystyrene and the shell is made of polyethylene.

* * * * *